_United States Patent_ [19]

O'Kane

[11] Patent Number: 4,621,003
[45] Date of Patent: Nov. 4, 1986

[54] PORTABLE PAD FOR IRONING

[76] Inventor: Susan O'Kane, 27 Flamingo Plz., Hialeah, Fla. 33010

[21] Appl. No.: 740,964

[22] Filed: Jun. 4, 1985

Related U.S. Application Data

[63] Continuation-in-part of Ser. No. 532,549, Sep. 15, 1983, abandoned.

[51] Int. Cl.$^4$ ............................................. B32B 3/00
[52] U.S. Cl. ...................................... 428/71; 428/77; 428/137; 38/140
[58] Field of Search .......................... 428/71, 77, 137; 38/140

[56] References Cited

U.S. PATENT DOCUMENTS 4,030,200 6/1977 Francis ..................................... 33/11
4,360,984 11/1982 Ruttenberg ........................... 428/71

_Primary Examiner_—Joseph L. Schofer
_Assistant Examiner_—Bernard Lipman
_Attorney, Agent, or Firm_—John Cyril Malloy

[57] ABSTRACT

A flexible portable pad to serve as an ironing board for travelers and the like which is composed of a laminated structure including exteriorly disposed heat resistant sheets of material sandwiching therebetween a padding structure and wherein the laminated structure and padding are secured to one another by a peripherally disposed tape and peripheral stitching securing together the components of pad and wherein a hanger element is provided in the form of a loop extending outwardly from one of the edges. The pad, when not in use, is capable of being rolled upon itself after being folded in half and there is further provided a carrying bag with a mouth sized to receive the folded rolled pad therein. A closure means is provided about the mouth so that, once the pad is inserted into the bag, the device is adapted to be closed for convenient storage of the bag and portable pad within a suitcase or the like.

8 Claims, 6 Drawing Figures

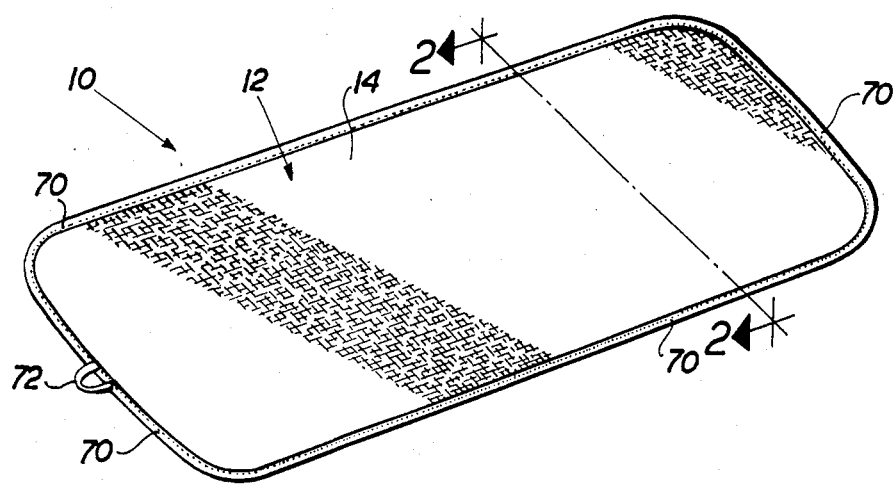
FIG. 1
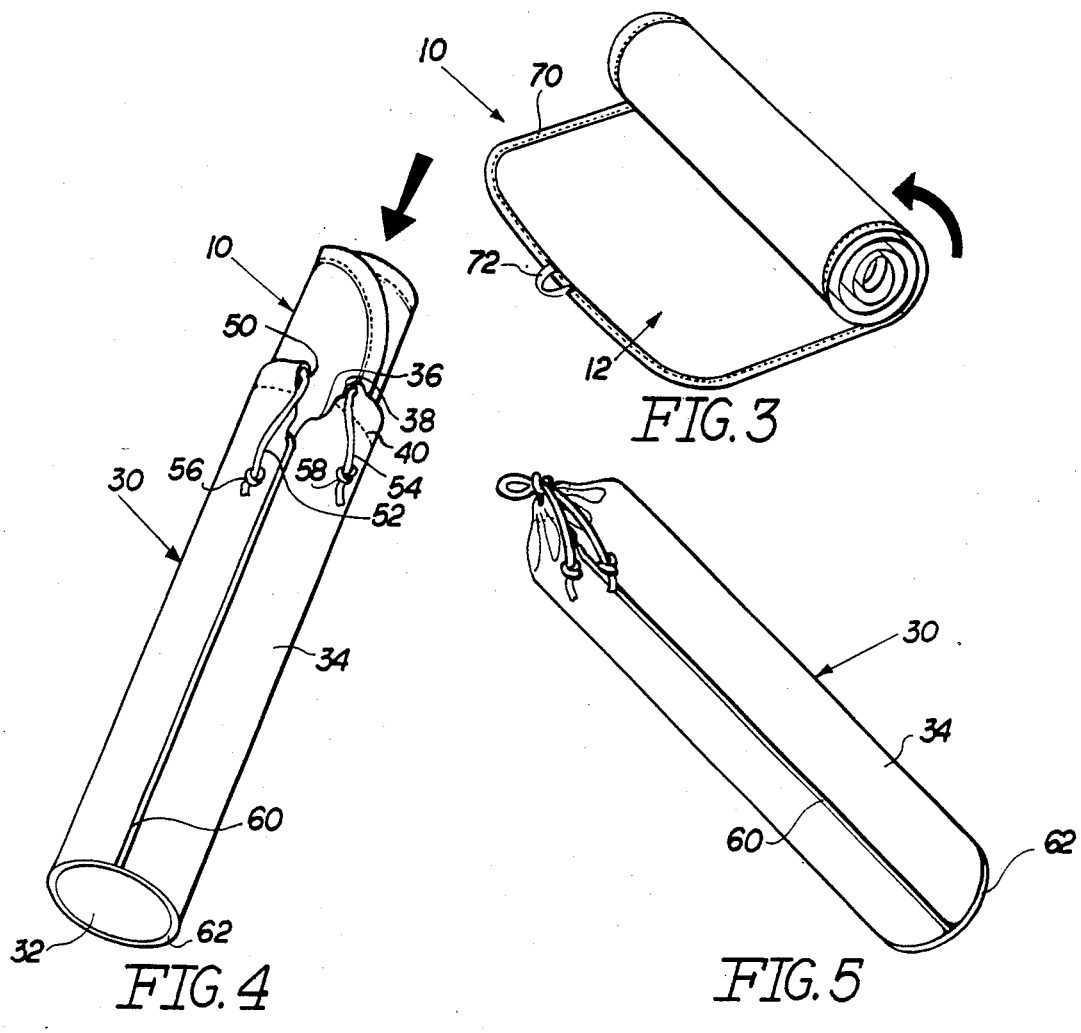
FIG. 3
FIG. 4
FIG. 5

PORTABLE PAD FOR IRONING

BACKGROUND OF THE INVENTION

This device has previously been disclosed in part in documents earlier filed under the Disclosure Document Program in the U.S. Patent and Trademark Office, which were assigned Ser. No. 114,077 filed Feb. 2, 1982, now U.S. Pat. No. 4,314,366, and is a continuation-in-part application of presently copending patent application Ser. No. 532,549 filed Sept. 15, 1983.

FIELD OF THE INVENTION

This invention is of a flexible portable pad to serve as an ironing board.

DESCRIPTION OF THE PRIOR ART

As is perhaps well known, it is quite often necessary, especially for travelers, to iron various items. There have been heretofore developed various types of small irons to iron such clothing; however, the problem has been that it is difficult to find a suitable place in a hotel room, for example, to do such ironing. Many such hotels have furniture which is of formica and can be readily damaged if the garment is spread out upon the furniture. This invention is of a flexible portable pad which is adapted to be rolled upon itself and stored and carried in a bag and which can be removed from the bag, unrolled and positioned on a table to be utilized as an ironing board at many varied locations. The subject pad is made from an outer covering on both the bottom and top outer exposed surfaces of a Teflon based material. More specifically, this outer heat resistant material is commercially available and generally produced by spraying a Teflon coating onto a fabric backing to the point where such fabric backing is impregnated. Such heat resistant material is sold under the trade name Iron Quik produced by the Graniteville Corporation. Once the Teflon coating is adhered to the fabric based backing, it becomes integral therewith and, again, defines the outer exposed sheet on both the top and bottom surfaces of the pad. This heat resistant sheet is then secured, as by adhesive to a first cotton fabric sheet and next to a remay fabric which is a non-woven fabric commonly known in the fabric producing industries. Next a padding structure is secured to the above set forth laminated structure and the entire padding structure and laminated structure is then secured to an under base sheet of the same Teflon coated fabric, Iron Quik, such that the entire outer surface of the resulting portable ironing pad is defined by heat resistant material.

OBJECTS OF THIS INVENTION

It is, accordingly, an object of this invention to provide an improved flexible pliable portable ironing board pad which is composed of an envelope of heat resistant sheets of material which are preferably reflective and wherein there is sandwiched therebetween a padding structure; the envelope and padding are peripherally stitched together and, when not in use, is adapted to be folded upon itself and rolled into a cylindrical form to be received in a bag with an open mouth sized to receive the same; and wherein the bag is provided with a closure for providing a neat package adapted to be carried by travelers and readily used at different locations.

It is a general object of this invention to provide an improved ironing board pad of the type described which is flexible and pliable and sized to be received within a bag for travel; and it can be folded and unrolled and positioned on a surface, such as on a dresser, to be flat and to be utilized in ironing.

In accordance with these and other objects which will become apparent hereinafter, the instant invention will now be described with reference to the accompanying drawings, in which:

BRIEF DESCRIPTION OF THE DRAWINGS

FIG. 1 is a perspective view of the invention in an unrolled position.

FIG. 3 is a perspective view showing the invention being rolled up.

FIG. 4 is a perspective view of the ironing board pad being inserted into the carrying case.

FIG. 5 is a perspective view of the carrying case containing the ironing board pad.

DETAILED DESCRIPTION OF PREFERRED EMBODIMENT

Figure 2A:
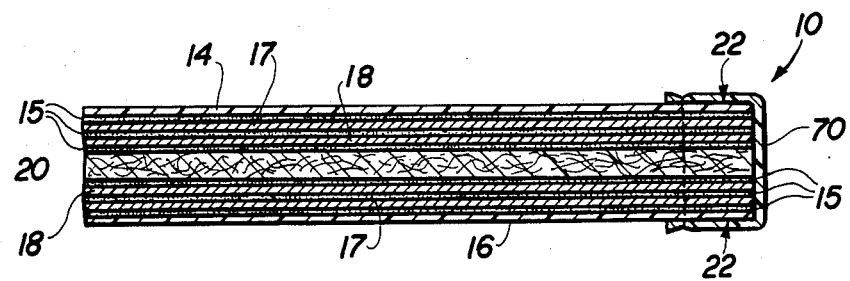
FIG. 2A is a cross-sectional view in partial cutaway of the invention taken along the section line 2—2 indicated in FIG. 1.

Referring to the drawings wherein like reference characters designate like or corresponding parts throughout the several views and referring particularly to FIG. 1, there is shown a flexible pliable portable pad 10 to serve as an ironing board for travelers, for example.

It is composed of an envelope 12 comprising a first and a second sheet of heat reflective material 14 and 16 of substantially similar size overlaying one another and when stitched together defining the envelope. Within the envelope there is provided a flexible padding structure pad 20, which is similarly sized to the sheets of the envelope. Means 22, such as stitching, are provided to secure the peripheral edges of the pad and envelope together to define the overall flexible portable pad 10.

In a preferred embodiment of the present invention, as clearly shown in FIGS. 1 and 2A, the portable ironing pad is generally indicated as 10 and comprises an outer sheet 14 and an under sheet 16 positioned to define the exposed and/or outer surfaces of the ironing pad 10. These sheets are formed from a heat resistant material, more specifically a Teflon material coated onto a fabric base such as but not limited to a cotton fabric base wherein the Teflon coating has sufficient density to become an integral part of the fabric base and thereby render such sheets 14 and 16 heat resistant or reflective. Such sheets are capable of withstanding the heat generated from a typical household iron appliance without scorching or like damage being done thereto. Further, the material from which the outer sheets 14 and 16 are formed is commercially available and known in the industry under the trade name Iron Quik manufactured by the Graniteville Corporation.

With reference to the embodiment of FIG. 2A, a sectional view of the structure of the sheet indicates that the topmost heat resistant or Teflon sheet 14 is adhesively secured to a cotton fabric backing sheet 17 wherein the adhesive coating therebetween is represented as 15. Similarly, an additional backing sheet of remay 18 which is a non-woven fabric commonly recognized in the textile industry, is adhesively secured by adhesive coating 15 to the cotton fabric backing 17. The remay sheet 18 is then additionally adhesively secured to the padding structure 20. The padding structure may be made of any type of suitable "padding" material including but not limited to canvas or burlap. In the embodiment of FIG. 2A, the padding is then adhesively secured to a similar remay sheet undercoating 18 by adhesive 15. An additional sheet of cotton fabric 17 is adhered by adhesive 15 on both sides thereof so as to form the backing sheet to the exteriorly disposed heat resistant sheet 16 as described above. Accordingly, the padding structure 20 is in effect sandwiched between the outer exposed heat resistant or reflective material sheets 14 and 16 and further secured about the peripheral edge by the tape structure 70. The tape structure 70 is further attached to the peripheral edge portions of the sandwiched portable pad structure 10 as by stitching as at 22.

Figure 2B:
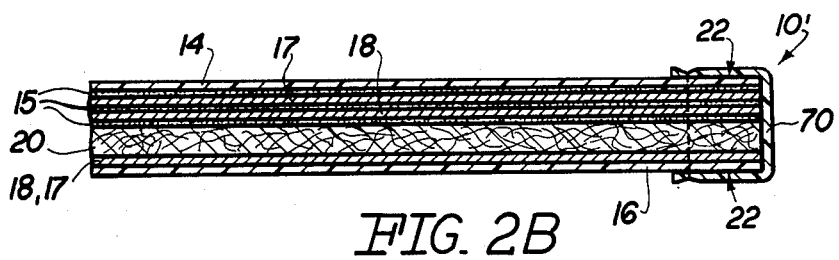
FIG. 2B is a cross-sectional view in partial cutaway of another embodiment of the invention taken along a similar section line 2—2 indicated in FIG. 1.

With regards to the embodiment of FIG. 2B, a second portable pad 10' comprises similarly disposed outer heat resistant material sheets 14 and 16 made from the Teflon coated fabric "Iron Quik" as described above. Also, the underportion of the upper heat resistant sheet 14 is similar to that of the embodiment of FIG. 2A in that a cotton fabric backing sheet 17 is adhesively secured to the undersurface of the outer sheet 14 and an additional sheet of remay 18 is adhesively secured to the cotton fabric sheet 17, as by adhesive 15, and also adhesively secured to the padding 20 as by adhesive 15. However, the embodiment of FIG. 2A differs from the embodiment of FIG. 2B in that the latter embodiment discloses a single sheet of the cotton fabric and/or remay 18, 17, disposed, in non-adhering fashion, between the padding structure 20 and the under sheet 16. The interconnection between the under sheet 16, backing sheet 18 or 17 and padding structure may rely solely on the stitching 22 securing the peripheral tape 70 in place.

In either of the embodiments of FIGS. 2A and 2B, it is important that the adhesive 15 serves to secure the under sheets 17 and 18 between the padding structure 20 and the exposed sheet 14 substantially over the entire surface thereof so as to prevent slippage between the outer exposed or upper sheet 14 and the padding structure 20 since this is the primary surface on which ironing is to be accomplished. This adhered interengagement over the surface area prevents bunching or gathering of the padding structure 20 and/or outer sheet 14 relative to each other. In the embodiment of FIG. 2B, the undersurface disposition defining the undersurface of the pad 10' being formed from a heat resistant material as at 16 is for purposes of precaution only and such surface is not intended to be the primary surface on which ironing is to occur. Accordingly, the bunching or gathering effect between the sheet 16 and the padding structure 20 is not as critical.

However, the embodiment of FIG. 2A is provided in the case where the portable pad structure 10 is meant to be reversible to the extent that either the heat resistant sheets 14 and 16 may be used as the primary ironing surface Another structural feature of the present invention is a recommended adhesive 15 used to secure the under sheets to the padding structure 20 and the heat resistant sheets 14 and 16. Such adhesive may be ethylene vinyl acetate which is a water base adhesive. Also, the padding structure 20 may be formed from a polyester padding commonly known and commercially available. Yet further structural features of the present invention is the inclusion of all of the sheets of said structure including outer sheets 14 and 16, padding structure 20 and under sheets 17 and 18 all being formed from a flexible or, pliable material so as to allow the pad 10 and 10' to be folded and rolled upon itself as described in greater detail hereinafter. Further, the overall length of the flexible, pliable portable pad 10 is preferred to be about 32 inches while the width thereof is preferred to be approximately 14½ inches.

It is thus seen that the device is adapted to be folded upon itself along the midline minor axis or between the ends which is perpendicular to the two longitudinally extending edges. Thereafter, the folded pad is adapted to be rolled upon itself with the relatively short edges overlaying one another to define a cylindrical roll.

A sack 30 is provided to recieve the portable pad 10 when it is in the rolled condition. The sack is of a length substantially equal to but slightly longer than the distance between the two longitudinal edges of the pad. It includes a bottom 32, a cylindrical side wall 34 and an open mouth 36. The open mouth in the preferred embodiment is folded back upon itself 38 and stitched as indicated by the stitch lines 40 and within this edge there is captivated a string 50 having distal ends 52-54 which extend thereform provided with knots 56-58 so that the string can be tightly drawn together. In the preferred embodiment there is a longitudinal stitch 60 and a circumferential stitch 62 at the bottom defining the sack.

In a preferred construction, a tape 70 is provided peripherally about the envelope which tape is stitched to the heat reflective sheets of the envelope and through the flexible pliable sandwiched pad therebetween. In the preferred embodiment, the tape includes a portion centrally located at one of the ends defining a loop 72 which is utilized for the purpose of hanging the device if desired from a hanger.

It will be recognized that departures may be made from the foregoing described product. For example, one of the sheets of the envelope may be of heat resistant material but in the preferred embodiment both are of such material to avoid error by a user. It has been found that the device is highly useful for travelers since the size and shape and relative lightweight of the material make it ideal for being included in small suitcases for which it is sized to be received and adopting it for use on a wide range of size of dressers, tables, and the like. It can be used by travelers when desired by simply removing it from the bag, laying it on a dresser or tabletop and conducting one's ironing operation.

The heat resistant material described herein provides a smooth and flat surface when in a planar condition and, nevertheless, when rolled into a cylindrical roll which is desirable for travel adapting it for being carried conveniently in a suitcase or the like.

Thus, the instant invention has been shown and described in what is considered to be a practical and preferred embodiment, however, it is recognized that departures may be made therefrom within the spirit and scope of this invention which is therefore not to be limited except by the claims set forth hereinafter under the doctrine of equivalents.

What is claimed is:

1. A portable ironing board assembly of the type primarily designed to be carried with and used by travelers, said assembly comprising:

(a) an envelope including a first sheet and a second sheet each formed of a flexible material of sufficient flexibility to be rolled upon itself into a stored position and each corresponding in dimension and configuration to one another, said first and said second sheets disposed in overlying relation to one another and positioned to define oppositely disposed and exposed surfaces of said envelope, (b) a flexible material padding structure corresponding in dimension and configuration to said first and second sheets and disposed in sandwiched relation between said first and second sheets and being of sufficient flexibility to be rolled along with said first and second sheets, (c) a first undersheet and a second undersheet formed of a flexible material fabric and being adhesively secured to one another and adhesively secured to and between at least an undersurface of said first sheet and a cooperatively positioned surface of said padding structure, substantially over the entire respective surfaces of said first sheet and said padding structure, (d) said envelope including a closed configuration defined by a securing means for securing the peripheral edge of the envelope and interconnecting correspondingly positioned peripheral edges of said first and said second sheets, said first and said second undersheets and said padding structure to one another along the length of the periphery of said envelope, (e) said first and said second sheets each comprising a fabric base coated over the entire surfaces thereof with a heat resistant material until said first and said second sheets are impregated therewith, and (f) said first and said second sheets of said envelope comprising oppositely disposed and exposed surfaces thereof and dimensioned and configured for performing ironing on at least one of said exposed surfaces.

2. An assembly as in claim 1 wherein said securing means includes a tape wrapped about respective peripheral edges of said first and said second sheets, said first and said second undersheets and said padding structure and further including stitching extending in penetrating relation through said tape, each of said first and second sheets, said first and second undersheets and said padding structure; said tape and said stitching extending along the length of the periphery of said envelope and said padding structure disposed in substantially fixed relation to said first and second sheets, whereby ironing on an exposed surface of said envelope will not displace said pad.

3. An assembly as in claim 1 wherein said first sheet comprises an outermost upper exposed sheet of said envelope and said second sheet forms an outermost underexposed sheet of said envelope, an additional first and an additional second sheet adhesively secured to one another and to the undersurface of said second sheet and also to a correspondingly positioned surface of said padding structure so as to be sandwiched therebetween.

4. An assembly as in claim 3 wherein said assembly further comprises a carrying sack structured and dimensioned to receive and encase said envelope when rolled upon itself into said stored position.

5. An assembly as in claim 4 wherein means are provided to close said sack.

6. An assembly as in claim 5 wherein said means to close said sack comprises a string captivated within a peripheral tunnel about an open end of said sack and said open end of said sack defining a closable mouth member of a first radius and said carrying sack being of a diameter sized to snugly receive said flexible portable envelope therein when in said rolled condition.

7. An assembly as in claim 1 wherein said portable pad is structured to be folded in half about the short axis thereof and rolled upon itself to form a generally cylindrical member of a first radius and said carrying sack being of a diameter sized to snugly receive said flexible envelope when in said rolled condition.

8. An assembly as in claim 1 further comprising means to hang said envelope including a loop extending outwardly from one edge thereof.

* * * * *